Aug. 2, 1960    H. S. HOLLOWAY    2,947,342
TIRE CHAFER
Filed Sept. 12, 1957

INVENTOR.
HAROLD S. HOLLOWAY
BY  W. A. Fraser
ATTY.

United States Patent Office 2,947,342
Patented Aug. 2, 1960

2,947,342
TIRE CHAFER

Harold S. Holloway, Akron, Ohio, assignor to The Firestone Tire & Rubber Company, Akron, Ohio, a corporation of Ohio Filed Sept. 12, 1957, Ser. No. 683,604

6 Claims. (Cl. 152—362)

This invention relates to means for protecting the beads of tires and more particularly to means for protecting the beads of pneumatic tubeless tires from rubbing by the rims upon which such tires are mounted.

Recent developments in the field of tire manufacture have lead to the marketing of a tire designed to operate without an innertube. The load supporting air pressure in such a tubeless tire is contained in the chamber formed by the rim and tire mounted thereon. The segment of the cavity wall formed by the tire is made air impervious by an innerliner of rubber-like material adhered across the inner face of the tire body from bead to bead. The rubber-like material regrettably is not completely impervious to air but is substantially so. One such liner may be comprised of butyl rubber alone or such a liner may be made of a combination of butyl rubber with another rubber or plastic material. Butyl rubber is a rubbery copolymer of an isolefin such as isobutylene with a conjugated diolefin such as isoprene. To prevent air from escaping between the bead and the rim bead seat and to protect the bead of the tire from penetration by air, special precautions must be taken. Experience has shown that if the surface of the bead is abraded or cut by the rim flange of the tire, air from the air chamber seeping between the beads and the rim will enter the fabric plies and flow under pressure to remote portions of the tire to cause deterioration of the rubber and separation of the plies or separation of the tread from the tire body during operation.

For various reasons conventional bead construction and standard precautions to prevent this undesirable result have been unsuccessful. The present invention overcomes the failings of prior art bead construction in this respect by a novel combination of rubber-like plies and rubberized fabric strips and in one modification of the invention by use of a combination of plies including an abrasion strip composed of a special rubbery compound over the exterior surface of the bead.

It is therefore an object of the invention to provide means for making the bead of a tubeless tire both resistant to abrasive rubbing of the rim and substantially impervious to the passage of air.

A further object of the invention is to provide a bead for a tubeless tire made up of a novel combination of rubber-like plies with rubberized fabric plies.

Yet another object of the invention is to provide an improved method for manufacturing a bead for pneumatic tires. A further object of the invention is to provide a novel bead construction in a pneumatic tire comprised of fabric imbedded in unvulcanized rubber sandwiched between two pre-cured rubber-like strips.

Still another object of the invention is to provide a chafer comprised of a combination of rubber and fabric protective strips, the outermost or surface abrasion strip being composed of a rubbery composition comprised of a copolymer of butadiene and styrene copolymerized at low temperatures.

These and other objects of the invention will become apparent with reference to the specification, claims and drawings of which:

Although the present invention is especially useful in large multi-ply tubeless truck tires operating at contained air pressures above the normal passenger tire air pressure of 24 p.s.i., the advantages of the invention are suitable for all pneumatic tubeless tires.

Figure 1:
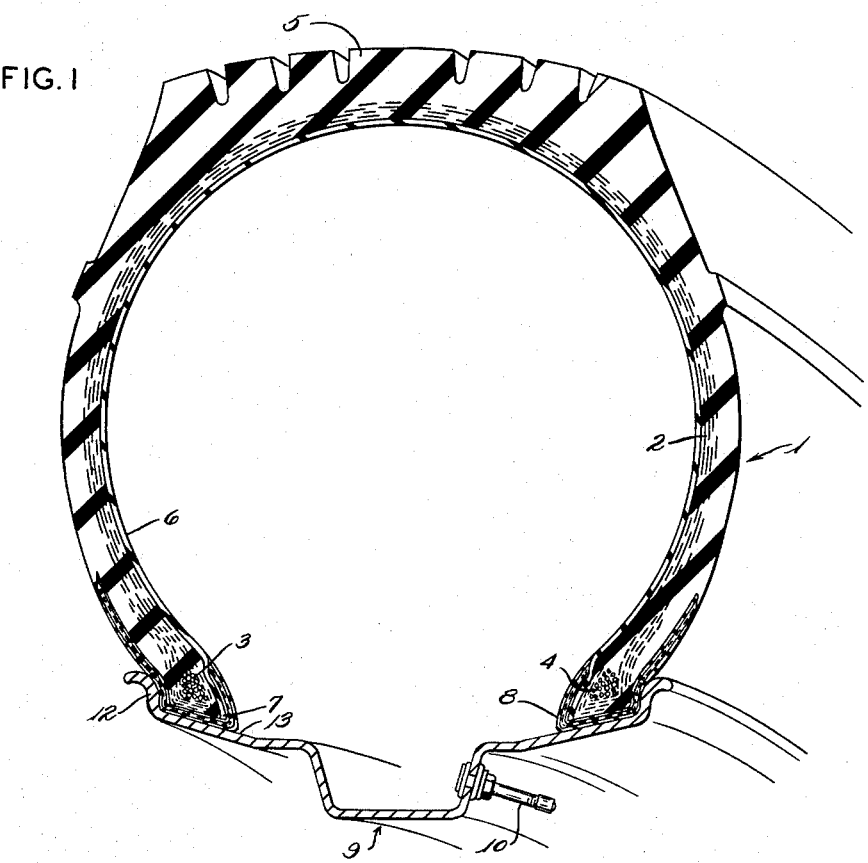
Figure 1 is a perspective view partially in section of a tire embodying the invention.

With reference to Figure 1, tire 1 is comprised of multiply rubberized fabric body portion 2, terminating at its edges in inextensible bead portions 3 and 4, and capped with an abrasion-resistant tread 5. An innerliner 6 is adhered to the innermost ply of fabric body 2 and extends at least from the toe 7 of one bead and around the inner wall of the air containing cavity to terminate at the toe 8 of the other bead. In some modifications of the invention the innerliner extends around the bead toe and even as far or farther than the heel of the bead. Innerliner 6 preferably is comprised of an air impervious, rubbery material such as, but not necessarily limited to, butyl-type rubber or mixtures of such rubber with other rubbery or plastic materials. Tire 1 is mounted for road operation on a rim generally indicated at 9 which is provided with a valve 10 for the introduction of air under pressure into the air cavity defined by rim 9 and tire 1.

Figure 2:
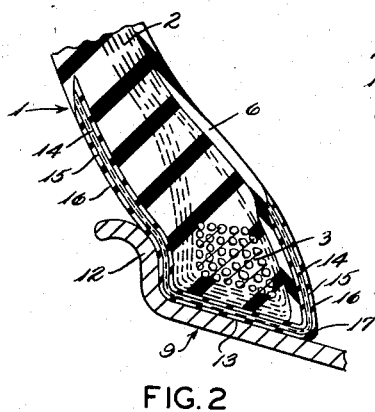
Figure 2 is an enlarged fragmentary sectional view of a tire bead embodying the chafer element of the invention.

Referring to Fig. 2 bead 3 is supported against axial movement by rim side flange 12 and supported radially by the rim bead seat 13. During rotation of the wheel during vehicle operation, deformation of the tire as it contacts the road causes bead 3 to rub against both the flange 12 and the bead seat 13. This rubbing action at the bead eventually wears through the rubber and often exposes the fabric plies allowing air to enter the tire body. To protect the fabric body plies, the present bead construction provides a combination of three strips comprising an innermost cushion strip 14, a center rubberized fabric strip 15 and an outer strip 16 (Fig. 2). The combination of these three strips cooperating together and with the other elements of the bead from the present invention. In a modification of the invention, abrasion strip 16 is formed from a specific and critical stock which will be disclosed hereinafter.

For example in the construction of a 10–22.5 truck tire employing the invention, the inner cushion strip 14 and the outer abrasion strip 16 are pre-cured and adhered to the center fabric strip 15.

*Cushion strip*

In preparation of the cushion strip 14 stock according to the following formula is mixed on an open two-roll mill or in a closed mixer:

| | |
|---|---:|
| Natural rubber | 100.00 |
| Carbon black | 40.00 |
| Phenol-aldehyde resin | 5.00 |
| Courmarone-indene resin | 4.70 |
| Zinc oxide | 2.80 |
| Stearic acid | 2.00 |
| Sulfur | 2.80 |
| Antioxidant | 2.00 |
| Tetramethyl thiauram disulfide | .22 |
| Dibutylammoniumoleate | .22 |
| Zinc mercaptobenzothiazole | .44 |
| | 160.18 |

The mixed stock is passed through a calender to form sheets having a thickness of about .040" and cut into strips about 2⅝" wide. These strips are vulcanized for 5 minutes at 280° F. in a hot air oven.

Abrasion gum strip

In the preparation of the abrasion gum strip 16 a rubbery stock according to the following formula was mixed on a two-roll mill (or in the alternative may be mixed in a closed mixer):

| | |
|---|---|
| GRS (polymerized at 41° F.) | 100.00 |
| Carbon black | 55.00 |
| Phenol-aldehyde resin | 15.00 |
| Softener | 8.60 |
| Zinc oxide | 3.50 |
| Stearic acid | 3.00 |
| Sulfur | 2.50 |
| Zinc mercaptobenzothiazole | .86 |
| Dibutylammoniumoleate | .43 |
| Tetramethyl thiauram disulfide | .43 |
| | 189.32 |

The stock was sheeted out on a calender and cut into strips approximately .040" thick and 2½" wide. These strips were vulcanized at a temperature of 280° F. for 8 minutes.

Fabric center strip

In preparing the fabric center strip, monofilament nylon fabric approximately .020 inch in thickness was rubberized by calendering with an unvulcanized rubbery stock having the following formula:

| | |
|---|---|
| Natural rubber | 100.00 |
| Carbon black | 46.00 |
| Softener | 7.53 |
| Coumarone indene resin | 3.00 |
| Stearic acid | 3.30 |
| Sulfur | 2.90 |
| Antioxidant | 3.97 |
| Dibenzylammoniumoleate | .50 |
| Benzothiazyl disulfide | .50 |
| | 167.70 |

The calendered sheets were cut into strips approximately 2½" wide and were interposed between the abrasion gum strip and the cushion gum strip. In the assembly of this sandwich strip the pre-cured abrasion gum strip 16 and cushion gum strip 14 were tackified by application of a suitable cement. (In the alternative a thin film of unvulcanized sheet rubber may be applied to the surface of these numbers.) The strips were placed in face-to-face relation with the respective sides of the rubberized fabric strip and pressure applied to adhere the surfaces of the three strips together.

Although the formation of the chafer strip of the invention has been described wherein the individual sheets were cut into strips and assembled into the sandwich, it is within the scope of the invention first to laminate the three sheets by calendering or otherwise, and then slit the thus formed sandwich sheet into strips of the desired dimensions to form the chafer.

Figure 3:
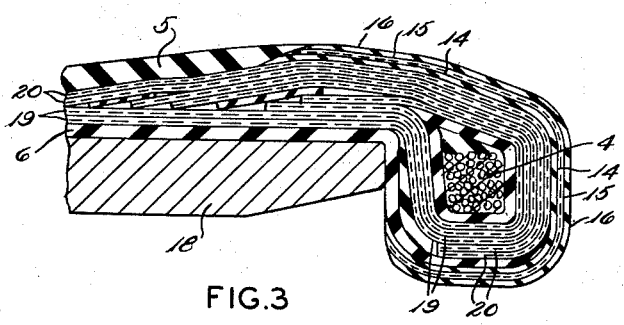
Figure 3 is a fragmentary sectional view of a tire building drum mounting a tire under construction and showing the position of the novel chafer of the invention during the tire building operation.

Referring to Fig. 3 an unvulcanized tire was built up on a tire building drum 18. The innerliner 6 was laid over the drum and a pair of plies 19 of rubberized fabric were laid on top of the liner 6. Bead 4 was applied to the edge of the building drum against the turned down edges of the rubberized fabric plies and the edges of those plies turned up to encompass the bead. A second pair of plies 20 of rubberized fabric were placed on top of the fabric now on the drum and turned down around bead 4. Rubbery tread portion 5 was applied to the top of the rubberized fabric barrel lying on the building drum. The steps of tire building thus far are conventional and well-known to those skilled in the art.

The rubberized sandwiched strip, previously described, was applied to the bead of the tire as shown in Fig. 3. When viewed in sections this strip extended from the radial inner surface of the bead around the heel and up onto the axial outer surface. The bead element thus assembled was stitched in a conventional manner to insure adequate adhesion. The tire was removed from the building drum, bagged and shaped in a conventional manner and vulcanized in a tire mold to yield a cure equivalent of 70 minutes at 280° F. The tire was removed from the mold, allowed to cool, and tested on a tire wheel under conditions which would result in early failure of a conventional tubeless tire. The novel tire performed satisfactorily with no escape of air from the tire cavity into the cords of the tire body.

Although the preferred form of the invention has been described as using a fabric center strip 15 wherein the fabric is monofilament material the invention includes, in the alternative, the use of any air impervious fabric material. Such materials may be rayon, cotton, nylon or other synthetic cords twisted or plaited, the sole requirement being that such cords be air impervious. One method of making such cords air impervious is by dipping in a rubbery solution such as described in copending application 425,494, of R. C. Koch.

In one form of the invention it has been found that an abrasion strip stock comprised of synthetic rubber polymerized at temperatures below 122° F. when properly compounded give much improved results over other synthetic rubber and natural rubber polymers. In a preferred form of this modification of the invention a copolymer of butadiene and styrene copolymerized at a temperature of 41° F. was mixed with about 40 parts of carbon black. LTP stocks using at least 40 parts of carbon black are superior to natural rubber and other synthetic rubber stocks using the same range of ingredients when processed according to the invention.

What is claimed is:

1. A tubeless tire comprised of an open-bellied vulcanized rubberized fabric body portion terminating at its edges in two inextensible hoop-shaped beads, said body portion having superimposed thereon a vulcanized rubbery tread portion, a substantially air impervious vulcanized rubbery liner adhered to the belly of said tire, a rubbery sandwich of at least three layers of rubbery material covering said inextensible bead portions over at least part of the radially inner and axially outer portions thereof, the innermost and outermost layers of said sandwich comprised of vulcanizable rubbery polymers stiffened to a substantially non-flowable state by a first vulcanization before the tire is vulcanized, the center layer of said sandwich being in a substantially unvulcanized state until said tire is molded and vulcanized whereby the innermost and outermost layers have a greater state of vulcanization than the state of vulcanization of the center layer.

2. A tubeless tire comprised of an open-bellied vulcanized rubberized fabric body portion terminating at its edges at two inextensible hoop-shaped beads, said body portion having superimposed thereon, a vulcanized rubbery tread portion, a substantially air impervious vulcanized rubbery liner adhered to the belly of said tire, said inextensible bead portions covered over at least part of the radially inner and axially outer portions by a sandwich of a rubberized monofilament sheet interposed between two layers of rubbery material, the innermost and outermost layers comprised of vulcanized rubbery polymers stiffened to a substantially non-flowable state by a first vulcanization before application to the bead of the unvulcanized tire, the rubber in rubberized sheet in a substantially tacky unvulcanized state when said tire is molded and vulcanized whereby the inner and outer layers have received a second vulcanization treatment while the center layer has received only one such treatment when the tire is cured.

3. A tubeless tire comprised of an open-bellied vulcanized rubberized fabric body portion terminating at its edges at two inextensible hoop-shaped beads, said body portion having superimposed thereon, a vulcanized rubbery tread portion, a substantially air impervious vulcanized rubbery linear adhered to the belly of said tire, said inextensible bead portions covered over at least part of the radially inner and axially outer portions by a sandwich of a rubberized nylon monofilament sheet interposed between two layers of rubbery material, the innermost and outermost layers comprised of vulcanized rubbery polymers stiffened to a substantially non-flowable state by a first vulcanization before application to the bead of the unvulcanized tire, the rubber in the rubberized sheet in a substantially tacky unvulcanized state when said tire is molded and vulcanized whereby the inner and outer layers have received a second vulcanization treatment while the center layer has received only one treatment when the tire is cured.

4. A tubeless tire comprised of an open-bellied vulcanized rubberized fabric body portion terminating at its edges at two inextensible hoop-shaped beads, said body portion having superimposed thereon, a vulcanized rubbery tread portion, a substantially air impervious vulcanized rubbery liner adhered to the belly of said tire, said inextensible bead portions covered over at least part of the radially inner and axially outer portions by a sandwich of a rubberized sheet of air impervious textile elements interposed between two layers of rubbery material, the innermost and outermost layers comprised of vulcanized rubbery polymers stiffened to a substantially non-flowable state by a first vulcanization before application to the bead of the unvulcanized tire, the rubber in the rubberized sheet in a substantially tacky unvulcanized state when said tire is molded and vulcanized whereby the inner and outer layers have received a second vulcanization treatment while the center layer has received only one treatment when the tire is cured.

5. A method of manufacturing the bead portion of a pneumatic tubeless tire comprising rubberizing a sheet of air impervious textile material, forming two sheets of vulcanizable rubbery material and vulcanizing each of said two sheets to a substantially non-fluid condition at the temperature of vulcanization, applying each of said two sheets in face-to-face relation with the two respective faces of the rubberized textile sheet to form a sandwich sheet, cutting said sandwich sheet into strips, adhering said strips across the radially inner and axially outer surfaces of an unvulcanized tubeless tire and vulcanizing said tire to give said two rubbery layers a second vulcanization whereby said sandwich maintains a substantially uniform thickness throughout the operation.

6. A method of manufacturing the bead portion of a pneumatic tubeless tire comprising rubberizing a sheet of air impervious textile material, forming two sheets of vulcanizable rubbery material and vulcanizing each of said two sheets to a substantially non-fluid condition at the temperature of vulcanization, cutting said textile sheet and said two rubbery sheets into strips, applying each of said two rubbery strips in face-to-face relation with the two respective faces of the rubberized textile strip to form a sandwich strip, adhering said sandwich strips across the radially inner and axially outer surfaces of an unvulcanized tubeless tire and vulcanizing said tire to give said rubbery layers a second vulcanization whereby said sandwich maintains a substantially uniform thickness throughout the operation.

References Cited in the file of this patent

UNITED STATES PATENTS

| | | |
|---|---|---|
| 1,553,883 | Theis | Sept. 15, 1925 |
| 2,563,787 | Keefe | Aug. 7, 1951 |
| 2,575,378 | Bender | Nov. 20, 1951 |
| 2,626,882 | Gerke | Jan. 27, 1953 |
| 2,638,955 | Gruber | May 19, 1953 |
| 2,803,283 | Gruber | Aug. 20, 1957 |
| 2,820,500 | Dickerson | Jan. 21, 1958 |
| 2,822,026 | Willis | Feb. 14, 1958 |
| 2,831,532 | Kasper | Apr. 22, 1958 |